(12) United States Patent
Starck et al.

(10) Patent No.: US 7,336,083 B2
(45) Date of Patent: Feb. 26, 2008

(54) CONNECTING SLEEVE FOR A BUS BAR CONNECTION IN A GAS-INSULATED SWITCHBOARD SYSTEM

(75) Inventors: Thierry Starck, Tegernheim (DE); Siegfried Ruhland, Obertraubling (DE)

(73) Assignee: Areva T & D SA, Paris (FR)

( * ) Notice: Subject to any disclaimer, the term of this patent is extended or adjusted under 35 U.S.C. 154(b) by 0 days.

(21) Appl. No.: 10/530,055

(22) PCT Filed: Aug. 16, 2003

(86) PCT No.: PCT/EP03/09081

§ 371 (c)(1),
(2), (4) Date: Nov. 23, 2005

(87) PCT Pub. No.: WO2004/034535

PCT Pub. Date: Apr. 22, 2004

(65) Prior Publication Data

US 2006/0125464 A1    Jun. 15, 2006

(30) Foreign Application Priority Data

Oct. 5, 2002    (DE) ............................... 102 46 557

(51) Int. Cl.
*G01R 31/04*    (2006.01)
*H01R 4/60*    (2006.01)
(52) U.S. Cl. ..................................... 324/538; 439/212
(58) Field of Classification Search ................ 324/543, 324/538; 439/212
See application file for complete search history.

(56) References Cited

U.S. PATENT DOCUMENTS 2,880,403 A * 3/1959 Maxwell ..................... 439/101
4,074,193 A    2/1978 Kohler
4,241,973 A * 12/1980 Mayer et al. ............... 439/581
5,323,117 A    6/1994 Endoh et al.
6,333,715 B1 * 12/2001 Kato et al. .................. 343/701
6,419,512 B2 *  7/2002 Starck ........................ 439/278

FOREIGN PATENT DOCUMENTS

DE    32 47 482 C2    7/1984

(Continued)

OTHER PUBLICATIONS

International Search Report and International Preliminary Examation Report.

(Continued)

*Primary Examiner*—Anjan Deb
*Assistant Examiner*—Amy He
(74) *Attorney, Agent, or Firm*—Harness, Dickey & Pierce, PLC

(57) ABSTRACT

A connecting sleeve generally used for a bus bar connection is produced from an insulating elastic material, often an elastomer material, having insulating properties which are deteriorated by partial discharges and decrease over the operating time of the switchboard system. According to the invention, so-called partial discharge measuring methods must be carried out, inter alia also in the UHF range (UHF: ultra high frequency), in order to identify damaging effects on the insulating material in time. For the reliable and simple detection of the measuring signals, the connecting sleeve (M) has an outer, electroconductive surface (OA) which is earthed, and an inner, electroconductive surface (OI) to which the voltage potential of the bus bar (S) is applied, in addition to a coupling electrode (KE) which is integrated into the insulating material (I).

6 Claims, 2 Drawing Sheets

FOREIGN PATENT DOCUMENTS

| | | |
|---|---|---|
| DE | 39 17 862 A1 | 12/1990 |
| DE | 40 10 373 A1 | 10/1991 |
| DE | 101 19 333 C1 | 5/2002 |
| EP | 1 111 748 A1 | 6/2001 |

OTHER PUBLICATIONS

German Search Report issued on Sep. 29, 2003.

* cited by examiner

CONNECTING SLEEVE FOR A BUS BAR CONNECTION IN A GAS-INSULATED SWITCHBOARD SYSTEM

BACKGROUND OF THE INVENTION

1. Field of the Invention

The present invention relates to a coupling sleeve for a bus bar connection as defined in the preambles of the Patent Claims, as well as to a gas-insulated switchboard system as set out in the preambles of the corresponding secondary claims, which incorporates such a connecting sleeve.

2. Description of the Related Art

In switchboard systems with gas-insulated switchboard sections or with other modules that are connected to one another through bus bar connections, exacting demands are imposed not only on the electrical contacts, but also on the gas seals themselves.

Within the area of the bus bar connection, it is customary to use a connecting sleeve that is of an elastic material, often an elastomer, which is in the form of a tube so as to enclose the bus bar in a reliable fashion and insulate it against the environment.

EP-A-1 111 748 describes a bus bar connection that is fitted with such an insulating connecting sleeve (manchon isolant).

However, the insulating properties can be degraded by partial discharges and can deteriorate during the operating time of the switchboard system. So-called partial-discharge measurements (TE measurements) must be made in order to ensure safe operation and before the system is put into operation so as to identify possible damage to the insulating material and so as to ensure installation that conforms to the relevant standards. In addition to methods that are base on optical and ultrasound principles, a usual method is electrical TE diagnosis (according to IEC 60270), in which the occurrence of partial discharges is monitored and recorded over time by using measuring sensors, which are also referred to a coupling electrodes, when the measurement signals obtained are subjected to intensive signal analysis. The signal analyses are completed in different frequency ranges that extend into the GHz ranges, which is to say into the UHF (ultra-high frequency) ranges. If signal analysis is completed in these ultra-high ranges, this is also referred to as UHF-TE diagnosis.

A UHF sensor (UHF coupling electrode) is usually integrated into a cast-resin part that is positioned in the gas chamber of the system in order to record the measurement signals. Or it is provided with a voltage take-off, by way of the bus bar.

These known measures entail the disadvantage that additional components with a not inconsiderable space requirement have to be built in, and this results in additional costs. In addition, in order to wire up the sensors and voltage take-offs, additional seals are needed to route the wiring out of the system. Furthermore, it is only possible to replace the sensors by entering the system gas chamber, and this makes additional gas work necessary.

For this reason, it is the objective of the present invention to propose a solution to these problems which permits reliable UFH TE diagnosis that is both safe and as simple as possible to be performed on a bus bar connection for gas-insulated switchboard systems.

SUMMARY

This objective has been achieved by a connecting sleeve for a bus bar connection having the features set out in the Patent Claims, as well as by a bus bar connection and a gas-insulated switchboard system that is fitted with this, with the features set out in the corresponding secondary claims.

According to these, it is proposed that the connecting sleeve have an outer, electrically conductive outer surface that is grounded, and an inner, electrically conductive surface to which the voltage potential of the bus bar is applied; and in that the connecting sleeve incorporate a coupling electrode that is imbedded in the insulating material.

These measures result in a very reliable measurement system in which the sensor (coupling electrode) is located outside the system gas chamber, so that no gas work is required when the sensor is replaced. Given this configuration of the connecting sleeve and the arrangement of the sensors, the primary capacity of the coupling electrode for the bus bar is a function of the surface of the electrode and the distance to the inner conductive layer (the inner, electrically conductive surface). For this reason, the primary capacity can be very large without this affecting the dielectric strength of the sleeve. It is thus possible to achieve a high partial-discharge sensitivity of the sensor (coupling electrode).

Particularly advantageous configurations of the present invention are set out in the secondary claims.

According to these, it is particularly advantageous that the coupling electrode have a sensor surface that is tangential to the outer surface. This makes it possible to avoid a field increase occurring in the area of the electrode, since this would affect the UHF TE measurement.

In this connection, it is advantageous that the coupling electrode be so imbedded in the insulating material that the coupling electrode is insulated from the inner surface and from the outer surface, and that the coupling electrode have an edge area that is lined up so that it overlaps the outer surface, at least in part.

It is also a particular advantage if the coupling electrode is connected with a plug-type connector that is located in an opening that is surrounded by the insulating material. In this connection, it is also advantageous if the plug-type connector can be connected with a mating element; and that the opening be matched to the outside shape of this mating element to form a dust- and moisture-proof plug connection. These measures create a reliable connection possibility for measuring equipment, in particular for voltmeters and spectrum analyzers.

BRIEF DESCRIPTION OF THE DRAWINGS

The present invention will be described in greater detail below on the basis of one embodiment shown in the drawings appended hereto. These drawings show the following:

FIG. 1 is a cross section through a bus bar connection SK that is intended to connect two switchboard sections F1, F2 (left-hand and right-hand parts of the drawing, respectively).

DETAILED DESCRIPTION OF EXAMPLE EMBODIMENTS OF THE PRESENT INVENTION

Figure 1:
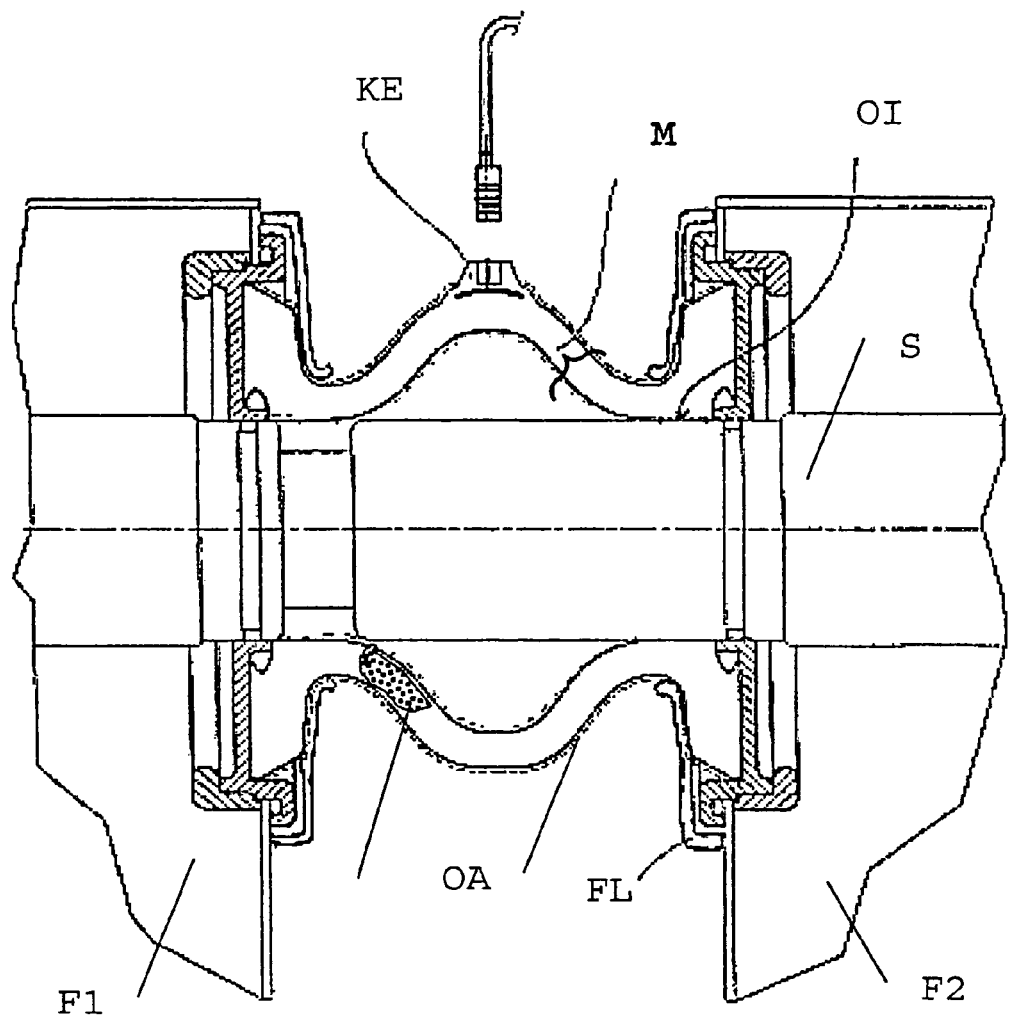
FIG. 1: The bus bar connection with a connecting sleeve according to the present invention, in cross section.

There are bus bar tubes S in the gas containers of the two switchboard sections F1 and F2; one end of each of these extends from the gas container so that they can be connected to one another through the bus bar connection SK. To this end, the bus bar tubes S are coaxial to each other, and the ends of each of them extend from an opening that is sealed off by sealing rings (O-rings). All of the leadthroughs are located on a container support and are sealed by O-rings so as to prevent the egress of insulating gas. One bus bar tube S of the second switchboard section F2 (right-hand part of the drawing) extends further out of its opening than the corresponding part of the first bus bar tube (left-hand part of the drawing).

A connecting sleeve M extends around the bus bar ends (ends of the bus bar tubes S), and this is in the form of a tube and of an elastic insulating material I, preferably an elastomer. The sleeve M is secured to the outer wall of the switchboard sections F1 and F2 through flanges FL and encloses the parts of the bus bar that extend beyond the switchboard sections. The connection is electrically insulated from and protected against the environment by this sleeve M.

According to the present invention, the sleeve M has an inner conductive surface OI that is in electrical contact with the bus bar S so that its voltage potential is applied to this inner surface OI. In addition, the sleeve M has an outer surface OA that is also electrically conductive. This outside surface OA is grounded through the flange and the walls of the gas containers of the switchboard sections F1 and F2.

A sensor in the form of a coupling electrode KE is incorporated in the middle area of the connecting sleeve M In order to capture the measurement signals during TE UHF measurement. The coupling electrode KE is positioned in the insulating material I and is formed as a concave curved surface that is tangential to the outer surface OA. The coupling electrode can be of a conductive material or of a semiconductor plastic. A contact pin is attached to the coupling electrode KE, and this pin forms part of a plug-type connector that is positioned in an opening and so can be connected to measuring equipment through a matching plug (counterpart of the connection).

Figure 2:
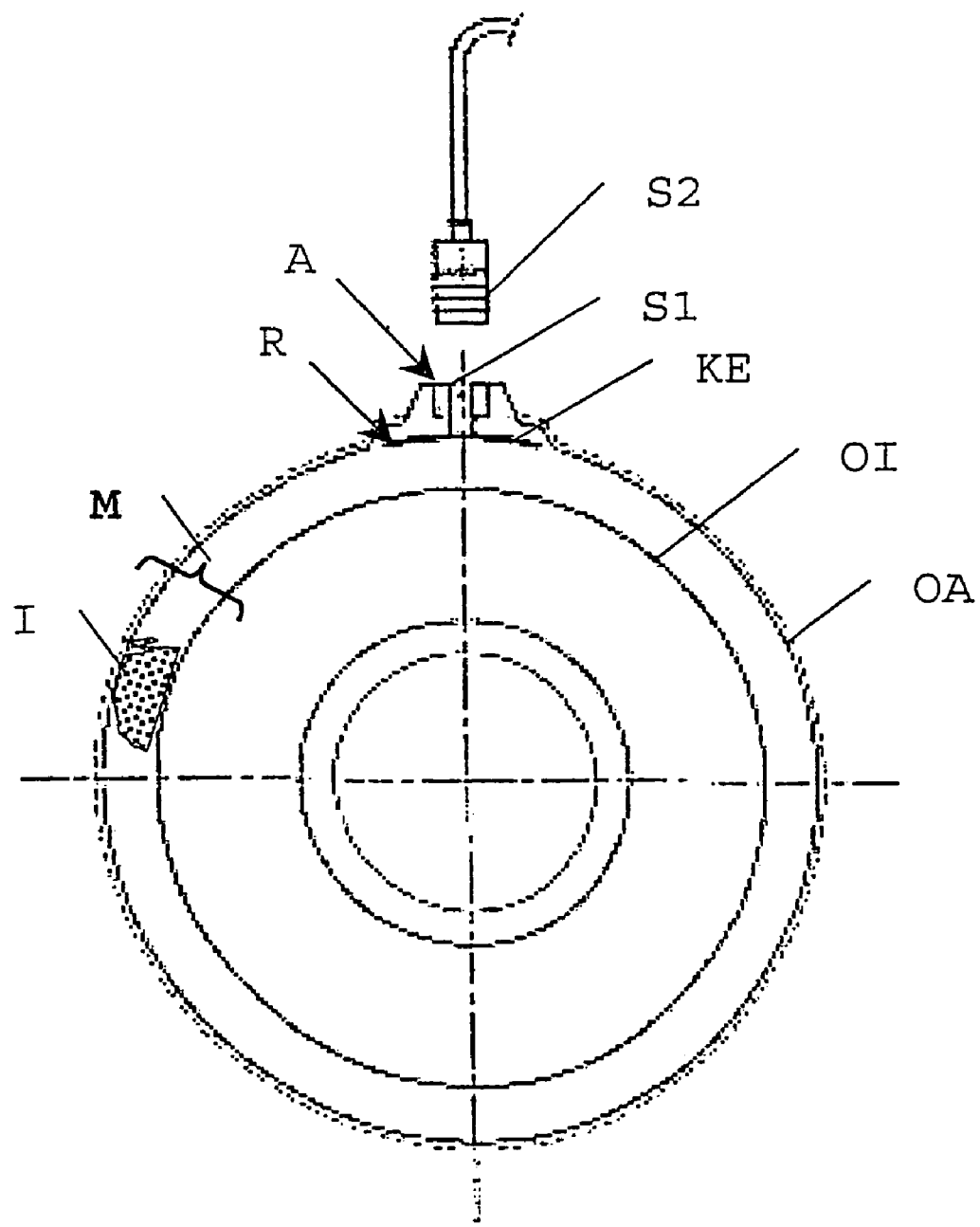
FIG. 2: The connecting sleeve according to the present invention, in a different cross section.

FIG. 2 is another cross sectional view of the sleeve M and shows the coupling electrode that is integrated therein more precisely.

As can be seen, the coupling electrode KE itself is imbedded in the insulating material I, with the edge area R of the sensor surface of the sensor surface overlapping the outside surface OA of the sleeve M. The electrode KE is thus separated from the grounded outside surface OA by a thin layer of insulating material I. Because of this, and because of the tangential orientation of the sensor surface, there is no noteworthy increase of the field in the area of the electrode. This entails the advantage that the primary capacity of the coupling electrode for the bus bar S is a function of the sensor surface of the electrode KE and the distance to the inside surface OI. For this reason, the primary capacity can be very large without affecting the dielectric strength of the sleeve M. Because of this, it is possible to achieve great sensitivity of the sensor KE to partial discharge.

Contact with the sensor KE is made through the plug-type contact S1 that is positioned within an opening A in the sleeve M and thus forms a socket in which the plug S2 fits exactly and is dust- and water-proof. Since the sensor KE is accessible from outside and is also located outside the gas chamber, not only is it very simple to establish a measurement contact; it is also possible to effect any replacement of the sensor KE that may become necessary without any difficulty.

The system as a whole contains only a few inexpensive components. No additional seals of the like are required, and there is no requirement for additional space.

For this reason, the system that is proposed is well suited for use in gas-insulated switchboard systems. Other potential applications are possible, such as its use in power transformers and the like.

What is claimed is:

1. Connecting sleeve for a bus bar connection, having inner and outer electrically conductive surfaces, that is used to connect two switchboard sections of a gas-insulated switchboard system, wherein:
   the connecting sleeve is an insulating, elastic material that is in the form of a tube;
   the outer, electrically conductive surface of the connecting sleeve is grounded;
   the connecting sleeve has a sensor in the form of a coupling electrode that is imbedded in the insulating material and electrically insulated from the inner and outer electrically conductive surfaces of the connecting sleeve; and
   the connecting sleeve has a hollow center which encompasses the bus bar connection, and wherein the voltage potential of the bus bar is applicable to the inner, electrically conductive surface of the connecting sleeve.

2. Connecting sleeve as defined in claim 1, wherein the sensor has a sensor surface that is tangential to the outer surface.

3. Connecting sleeve as defined in claim 1, wherein the sensor has an edge area that overlaps the outer surface, at least in part.

4. Connecting sleeve as defined in claim 1, wherein the sensor is connected to a plug connector that is positioned in an opening that is surrounded by the insulating material.

5. Connecting sleeve as defined in claim 4, wherein the plug connector can be connected to a mating element; and in that the opening is matched to the outer shape of this mating element so as to form a dust-proof plug-type connection.

6. Gas-insulated medium-voltage switchboard system, with at least two switchboard sections that are connected to one another through a bus bar connection that incorporates the connecting sleeve of claim 1.

* * * * *